US012187346B2

(12) United States Patent
Xian et al.

(10) Patent No.: US 12,187,346 B2
(45) Date of Patent: Jan. 7, 2025

(54) HIGH-INTEGRATION-LEVEL PLASTIC TAIL DOOR

(71) Applicant: NINGBO SHINTAI MACHINES CO., LTD., Ningbo (CN)

(72) Inventors: Yingguo Xian, Ningbo (CN); Yongtai Pu, Ningbo (CN); Guoqiang Ye, Ningbo (CN); Zhuozhi Liu, Ningbo (CN); Yidong Wang, Ningbo (CN); Zhijun Tao, Ningbo (CN); Zhiqing Du, Ningbo (CN)

(73) Assignee: NINGBO SHINTAI MACHINES CO., LTD., Ningbo (CN)

( * ) Notice: Subject to any disclaimer, the term of this patent is extended or adjusted under 35 U.S.C. 154(b) by 371 days.

(21) Appl. No.: 17/753,908

(22) PCT Filed: Aug. 24, 2020

(86) PCT No.: PCT/CN2020/110845
§ 371 (c)(1),
(2) Date: Mar. 17, 2022

(87) PCT Pub. No.: WO2021/052114
PCT Pub. Date: Mar. 25, 2021

(65) Prior Publication Data
US 2022/0371663 A1     Nov. 24, 2022

(30) Foreign Application Priority Data

Sep. 19, 2019   (CN) .......................... 201921559813.9
Sep. 19, 2019   (CN) .......................... 201921559815.8
Oct. 31, 2019   (CN) .......................... 201911053332.5

(51) Int. Cl.
*B62D 25/10*    (2006.01)
*B60J 5/10*     (2006.01)
(Continued)

(52) U.S. Cl.
CPC ........... *B62D 25/12* (2013.01); *B62D 25/105* (2013.01); *B62D 35/007* (2013.01); *B60J 5/107* (2013.01)

(58) Field of Classification Search
CPC .... B62D 25/12; B62D 25/105; B62D 35/007; B60J 5/10; B60J 5/101; B60J 5/107
See application file for complete search history.

(56) References Cited

U.S. PATENT DOCUMENTS 7,270,863 B2 *   9/2007   Harima ...................... B60J 5/00
                                                              428/45
8,403,399 B2 *   3/2013   Kuntze .................... B60J 5/107
                                                             296/205
(Continued)

FOREIGN PATENT DOCUMENTS

CN       205736816 U     11/2016
CN       206155578 U      5/2017
(Continued)

OTHER PUBLICATIONS

International Search Report dated Dec. 3, 2020 from corresponding PCT Application No. PCT/CN2020/110845.

*Primary Examiner* — Gregory A Blankenship
(74) *Attorney, Agent, or Firm* — INNOVATION CAPITAL LAW GROUP, LLP; Vic Lin

(57) ABSTRACT

Disclosed is a high-integration-level plastic tail door, comprising a tail door upper outer plate, a tail light, a tail door lower outer plate, an inner plate, and a high brake light, wherein the tail door upper outer plate, as a whole, is integrated with a spoiler, a tail door windshield, a windscreen decorating member, and a high brake light cover; the tail door upper outer plate is of two layers and is formed by means of double-shot molding, with a first layer being a transparent layer and a second layer being a black non-transparent layer; a first open hole is provided at the position
(Continued)

of the high brake light in a black non-transparent layer area; a second open hole is provided in the middle of the tail door windshield; and a hardened coating is arranged on the outer layer of the transparent layer.

9 Claims, 8 Drawing Sheets

(51) Int. Cl.
*B62D 25/12* (2006.01)
*B62D 35/00* (2006.01)

(56) References Cited

U.S. PATENT DOCUMENTS

| | | | | |
|---|---|---|---|---|
| 10,399,415 | B2* | 9/2019 | Leterrier | B60J 5/107 |
| 10,787,066 | B2* | 9/2020 | Bret | B60Q 1/2619 |
| 2011/0241376 | A1* | 10/2011 | Igura | B62D 25/105 |
| | | | | 296/146.3 |
| 2015/0291232 | A1* | 10/2015 | Watanabe | B23K 31/02 |
| | | | | 296/180.1 |
| 2018/0236699 | A1* | 8/2018 | Schellekens | B60J 5/0481 |
| 2018/0244136 | A1* | 8/2018 | Schellekens | B32B 27/365 |
| 2018/0252382 | A1* | 9/2018 | Schellekens | B32B 27/08 |
| 2018/0312204 | A1* | 11/2018 | Schellekens | B29C 45/16 |
| 2019/0176593 | A1* | 6/2019 | Bret | B60Q 1/2619 |
| 2019/0193533 | A1* | 6/2019 | Chiba | B60J 5/107 |
| 2019/0359036 | A1* | 11/2019 | Schellekens | B32B 27/365 |
| 2019/0375465 | A1* | 12/2019 | Coudron | B62D 29/043 |
| 2020/0017154 | A1* | 1/2020 | Ikeda | B60J 5/04 |
| 2022/0371663 | A1* | 11/2022 | Xian | B60J 5/107 |
| 2023/0001773 | A1* | 1/2023 | Hasl | B60J 5/10 |
| 2023/0113676 | A1* | 4/2023 | Katayama | B60J 1/006 |
| | | | | 296/56 |

FOREIGN PATENT DOCUMENTS

| | | |
|---|---|---|
| CN | 106904064 A | 6/2017 |
| CN | 108839542 A | 11/2018 |
| CN | 109774437 A | 5/2019 |
| CN | 110816678 A | 2/2020 |
| CN | 210881633 U | 6/2020 |
| EP | 0695848 A2 | 2/1996 |

* cited by examiner

HIGH-INTEGRATION-LEVEL PLASTIC TAIL DOOR

TECHNICAL FIELD

The invention belongs to the technical field of automotive bodies, and particularly relates to a high-integration-level plastic tail door.

DESCRIPTION OF RELATED ART

Plastic tail doors have the advantages of lightweight and integration, and with the increase of the integration level, the sense of wholeness will be improved, and matching problems of parts will be reduced, and the weight and cost will be reduced. At present, mainstream plastic tail doors are provided with an outer plate made of PP and an inner plate made of SMC or PP and LGF, a windshield, a windscreen decorating member, a tail light, a high brake light and a spoiler are typically assembled on a tail door body. As shown in FIG. 1 which is a diagram of main components of an existing tail door, the tail door mainly consists of a spoiler, a rear windshield, a windscreen decorating member, a tail light, a lower outer plate, an inner plate and a high brake light. However, the existing tail door has the following disadvantages: the windshield 1-2 is made of inorganic salt glass mainly prepared from $SiO_2$, has a density over 2.5 $g/cm^3$ and a thickness of 4 mm, thus being extremely heavy; the windshield is mounted generally after the spoiler, so a mounting clearance has to be reserved between the windshield and the spoiler and the outer plate, which compromises the attractiveness of the tail door; the windshield is adhered to the tail door with an adhesive, which increases the assembly difficulty and may cause sealing problems; and the high brake light is mounted in a groove of the spoiler from front to back and is exposed out of the tail door, so the high brake light has to meet sealing requirements of its own and meet sealing requirements to fit the spoiler, and has to match the spoiler in appearance, which makes the overall sealing performance and appearance effect unsatisfying. In addition, the windscreen decorating member and the tail door are difficult to position, the clearance plane is poor, and the appearance is unsatisfying.

BRIEF SUMMARY OF THE INVENTION

In view of the current situation of the prior art, the technical issue to be settled by the invention is to provide a high-integration-level plastic tail door, which can effectively improve the appearance quality and reliability of the tail door and achieve weight reduction and can effectively guarantee an assembly clearance of a windscreen decorating member.

The technical solution adopted by the invention to settle the above technical issue is as follows: a high-integration-level plastic tail door is characterized by comprising a tail door upper outer plate, a tail light, a tail door lower outer plate, an inner plate and a high brake light, wherein the tail door upper outer plate, as a whole, is integrated with a spoiler, a tail door windshield, a windscreen decorating member and a high brake light cover; the tail door upper outer plate has two layers and is formed by double-shot molding, with a first layer being a transparent layer and a second layer being a black non-transparent layer; a first open hole is formed in a position of the high brake light in a black non-transparent layer area, and a second open hole is formed in a middle of the tail door windshield; and a hardened coating is arranged on an outer layer of the transparent layer.

According to the high-integration-level plastic tail door, the tail door upper outer plate comprises, from left to right, a windshield transparent area, an original windshield black-edge area and a windscreen decorating member area, the windshield transparent area only comprises a single layer with transparent layer, the second open hole is located in the windshield transparent area, an inner layer of the original windshield black-edge area and the windshield decorating member area is the black non-transparent layer, is located below the transparent layer, and the inner plate is adhered to the black non-transparent layer of the tail door upper outer plate through an adhesive layer.

According to the high-integration-level plastic tail door, in a spoiler area, the inner plate is adhered to the tail door upper outer plate the adhesive layer, the tail door upper outer plate is only provided with a single layer with transparent layer at the position of the high brake light, the first open hole is formed in the black non-transparent layer beside the high brake light, a high brake mounting structure is disposed on a periphery the black non-transparent layer, and the high brake light is mounted on the high brake mounting structure from an inner side of the tail door upper outer plate.

According to the high-integration-level plastic tail door, the transparent layer at a lower end of the tail door upper outer plate and the black non-transparent layer below the transparent layer extend below the tail light and are adhered to the tail door lower outer plate through the adhesive layer, and the tail door lower outer plate is adhered to the inner plate through the adhesive layer.

According to the high-integration-level plastic tail door, a YZ-direction positioning pin is disposed on a surface of the spoiler, a YZ-direction positioning hole is formed in the windscreen decorating member, the YZ-direction positioning pin on the windscreen decorating member matches the YZ-direction positioning hole in the windscreen decorating member for positioning, a Y-direction auxiliary positioning pin is disposed on a surface of the inner plate, the spoiler is adhered to the inner plate with an adhesive to form a tail door body, and the windscreen decorating member is assembled on tail door body formed by adhering the spoiler to the inner plate.

According to the high-integration-level plastic tail door, an upward bevel is formed between the YZ-direction positioning pin and the windscreen decorating member in a horizontal direction.

According to the high-integration-level plastic tail door, the inner plate is provided with a metal reinforcing plate which comprises a pillar reinforcing plate, a hinge reinforcing plate and a ball pin reinforcing plate, wherein the hinge reinforcing plate and the ball pin reinforcing plate are electrically welded to an upper end and a lower end of the pillar reinforcing plate respectively, a first flange and a second flange for improving the stiffness of the pillar reinforcing plate are disposed on two sides of the pillar reinforcing plate, a U-groove structure is formed by the first flange, the second flange and the pillar reinforcing plate, and the first flange extends to a tail end of an area where the hinge reinforcing plate is located from the position of the ball pin reinforcing plate.

According to the high-integration-level plastic tail door, the hinge reinforcing plate and the ball pin reinforcing plate are both 2 mm galvanized steel sheets, and the first flange and the second flange have a width greater than 20 mm.

According to the high-integration-level plastic tail door, the hinge reinforcing plate is formed with a hinge mounting hole, an internal decorating member mounting hole is formed in a lower end of a hinge reinforcing plate on the pillar reinforcing plate, a first auxiliary positioning hole is formed beside the internal decorating member mounting hole, a second auxiliary positioning hole is formed in an upper end of the pillar reinforcing plate, and the first auxiliary positioning hole and the second auxiliary positioning hole are located on a same plane.

According to the high-integration-level plastic tail door, the ball pin reinforcing plate is formed with a ball pin mounting hole, the ball pin reinforcing plate and the pillar reinforcing plate are of a triangular structure, and the second flange extends to a platform area where the first auxiliary positioning hole is located from an area where the second auxiliary positioning hole is located.

Compared with the prior art, the invention has the following beneficial effects: the spoiler, the windshield, the high brake light and the windscreen decorating member are integrated into a whole, so that the appearance quality and reliability of the tail door are effectively improved, the weight is reduced, a pre-hanging effect is realized, and assembling is easy; moreover, such an assembly structure effectively guarantees an assembly clearance of the windscreen decorating member, guarantees a good appearance, greatly simplifies the design, saves materials, and reduces the weight and cost.

DETAILED DESCRIPTION OF THE INVENTION

The technical solution of the invention will be further described below in conjunction with specific embodiments and accompanying drawings of the invention, but the invention is not limited to these embodiments.

In the figures: 1, tail door upper outer plate; 2, tail light; 3, tail door lower outer plate; 3-1, YZ-direction positioning pin; 3-2, Y-direction auxiliary positioning pin; 3-3, YZ-direction positioning hole; 4, inner plate; 5, high brake light; 6, adhesive layer; 1-A, transparent layer; 1-B, black non-transparent layer; 1-B-1, second open hole; 1-A-1, windshield transparent area; 1-A-2, original windshield black-edge area; 1-A-3, windscreen decorating member area; 7, high brake light cover; 1-B-2, first open hole; 8, high brake mounting structure; 1-1, spoiler; 1-2, tail door windshield; 1-3, windscreen decorating member; 9, pillar reinforcing plate; 10, hinge reinforcing plate; 11, ball pin reinforcing plate; 12, hinge mounting hole; 13, internal decorating member mounting hole; 14, first auxiliary positioning hole; 15, ball pin mounting hole; 16, second auxiliary positioning hole; 17, second flange; 18, first flange.

Figure 1:
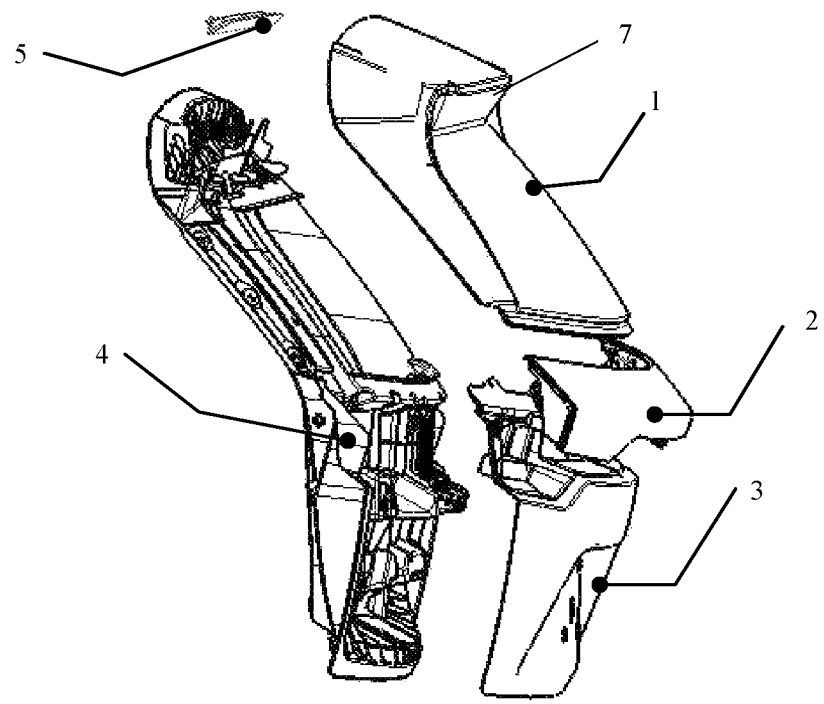
FIG. 1 is an effect diagram of a tail door assembly of the invention.
Figure 2:
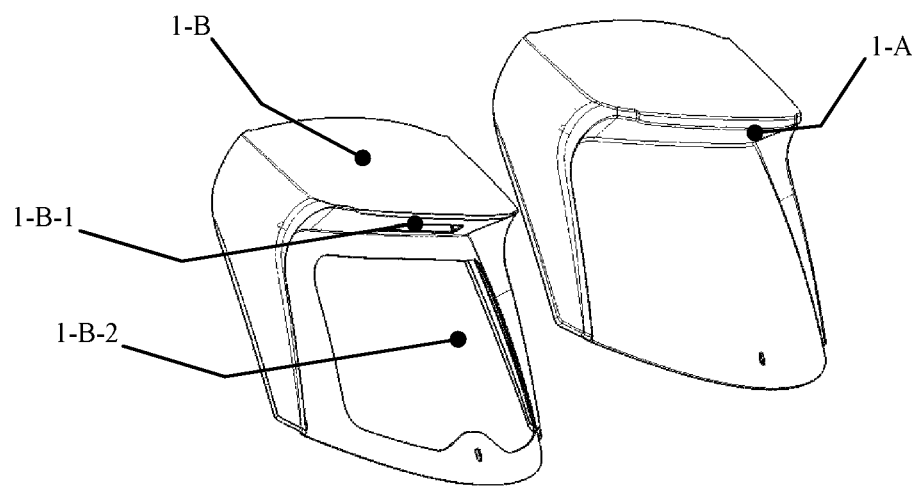
FIG. 2 is a schematic diagram of structural layers of a tail door upper outer plate of the invention.

As shown in FIG. 1 and FIG. 2, the high-integration-level plastic tail door comprises a tail door upper outer plate 1, a tail light 2, a tail door lower outer plate 3, an inner plate 4 and a high brake light 5, wherein the tail door upper outer plate 1, as a whole, is integrated with a spoiler 1-1, a tail door windshield 1-2, a windscreen decorating member 1-3 and a high brake light cover 7; the tail door upper outer plate 1 is of two layers and is formed by means of double-shot molding, with a first layer being a transparent layer 1-A and a second layer being a black non-transparent layer; a first open hole 1-B-2 is provided at the position of the high brake light 5 in a black non-transparent layer area, and a second open hole 1-B-1 is provided in the middle of the tail door windshield 1-2, and in this way, the tail door upper outer plate 1 is partially transparent. Here, the tail door upper outer plate 1 is integrated with the tail door windshield 1-2, the windscreen decorating member 1-3, the high brake light 5 and the spoiler 1-1, and is formed by double-shot molding, an outmost layer is the transparent layer 1-A, which is mainly made of PC and covers the whole tail door, and the black non-transparent layer is arranged at the position of the spoiler 1-1 and the position of the windscreen decorating member 1-3 and is an injection-molded layer mainly made of PC/ABS.

Figure 3:
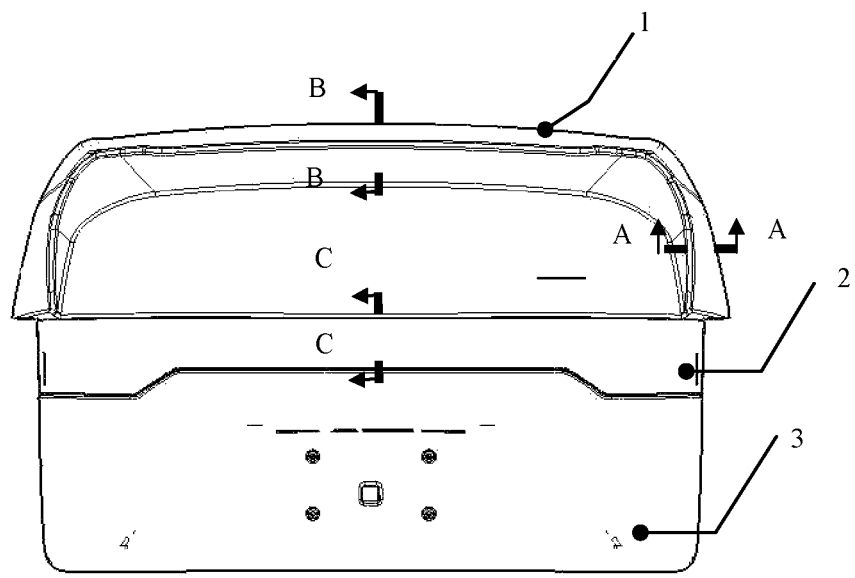
FIG. 3 is a front view of the tail door assembly of the invention.
Figure 4:
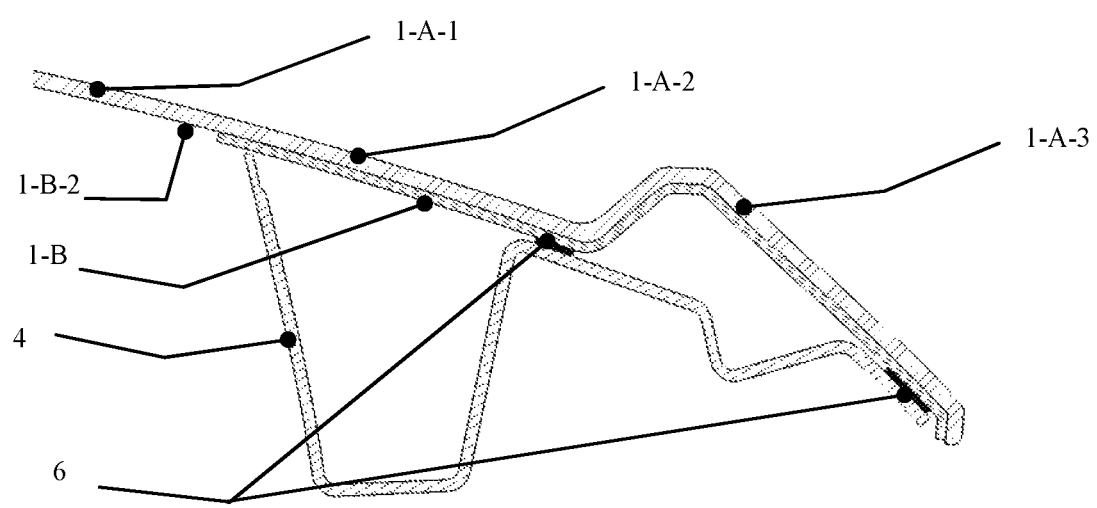
FIG. 4 is a partial sectional view along A-A in FIG. 3.
Figure 5:
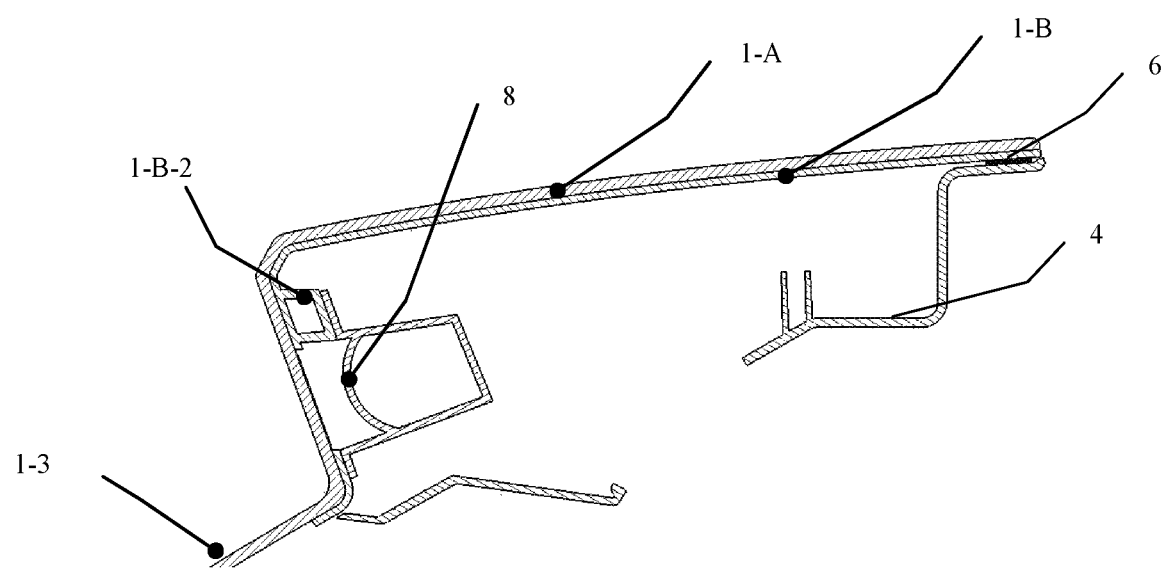
FIG. 5 is a partial sectional view along B-B in FIG. 3.

As shown in FIG. 3 and FIG. 4, the tail door upper outer plate 1 comprises, from left to right, a windshield transparent area 1-A-1, a windshield transparent area 1-A-2 and a windscreen decorating member area 1-A-3, wherein the windshield transparent area 1-A-1 only comprises a single layer with transparent layer 1-A, the second open hole 1-B-1 is located in the windshield transparent area 1-A-1, and an inner layer of the windshield transparent area 1-A-2 and the windscreen decorating member area 1-A-3 is a black non-transparent layer, is located below the transparent layer, and the inner plate 4 is adhered to the black non-transparent layer of the tail door upper outer plate 1 through an adhesive layer 6; and as shown in FIG. 5, in the area of the spoiler 1-1, the inner plate 4 is adhered to the tail door upper outer plate 1 through the adhesive layer 6, the tail door upper outer plate 1 is only provided with a single layer with transparent layer 1-A at the position of the high brake light 5, the first open hole 1-B-2 is formed in the black non-transparent layer beside the high brake light 5, a high brake mounting structure 8 is disposed on the periphery of the black non-transparent layer, and the high brake light 5 is mounted on the high brake mounting structure 8 from an inner side of the tail door upper outer plate. Here, the first open hole 1-B-2 is formed in the black non-transparent layer at the position of the high brake light 2 on the tail door upper outer plate 1, so that the transparency of this position is guaranteed; the high brake mounting structure 8 is arranged around the first open hole, and the tail light 2 is mounted on the outer plate from the inner side; and the transparent layer 1-A is able to function as an original light cover, is integrated with the high brake light cover 7, and fulfills a better sealing effect and a better appearance effect.

Figure 6:
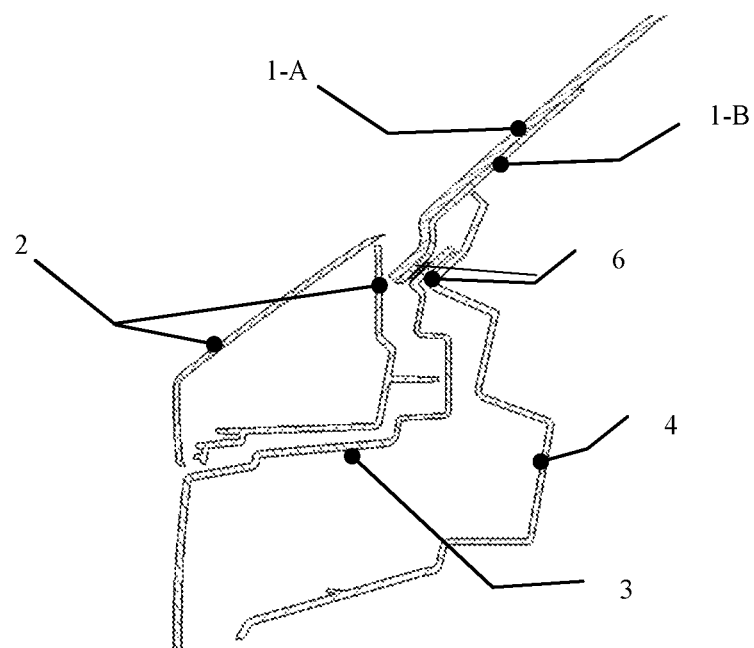
FIG. 6 is a partial sectional view along C-C in FIG. 3.

As shown in FIG. 6, the transparent layer 1-A at a lower end of the tail door upper outer plate 1 and the black non-transparent layer below the transparent layer 1-A extend below the tail light 2 and are adhered to the tail door lower outer plate 3 through the adhesive layer 6, and the inner plate 4 is adhered to the tail door lower outer plate 3 through the adhesive layer 6; the black non-transparent layer is formed with an open hole in the windshield transparent area 1-A-1, so that a transparency effect is realized. A hardened coating is disposed on an outer layer of the transparent layer 1-A. The hardened coating is additionally arranged on the tail door upper outer plate 1 mainly through shower coating or spray coating, so that the scratch resistance of the tail door is guaranteed. Paint does not need to be sprayed onto the tail door upper outer plate 1 anymore, and both the integrity and texture of the appearance are improved.

Figure 7:
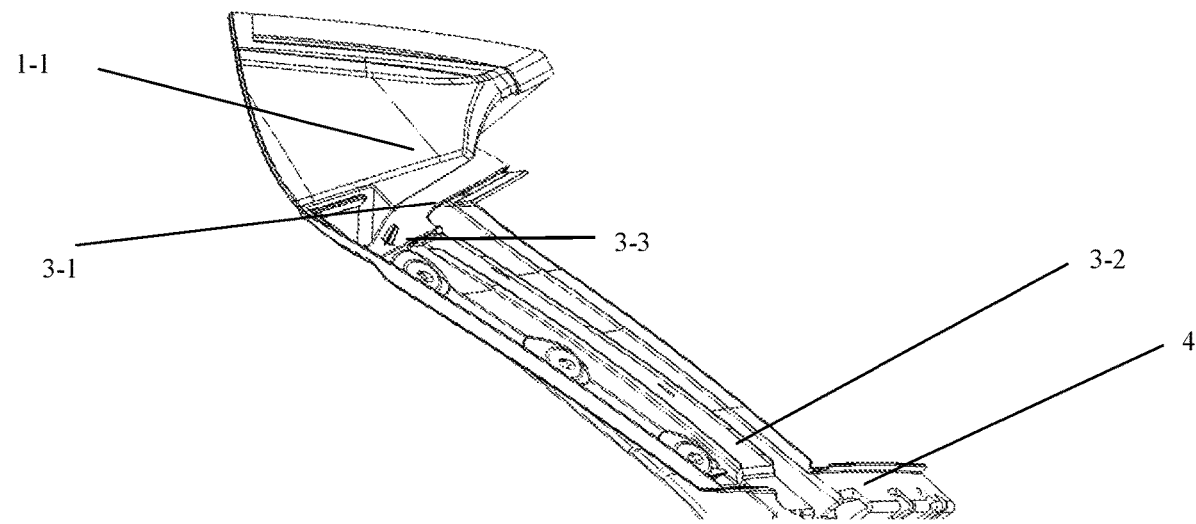
FIG. 7 is an overall structural view of a positioning structure of a wind screen decorating member of a plastic tail door.
Figure 8:
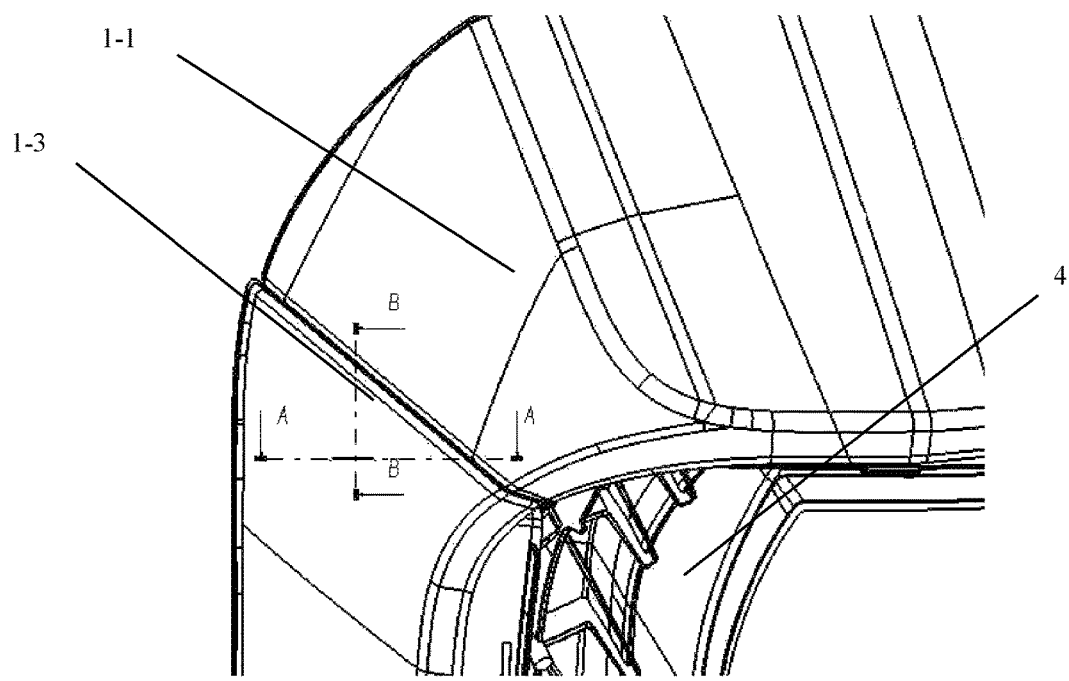
FIG. 8 is a structural view of FIG. 7 in another direction.

The windscreen decorating member 1-3 is formed integrally by injection-molding or is installed piece by piece. As shown in FIG. 7 and FIG. 8, to facilitate the installation of the windscreen decorating member 1-3, the windscreen decorating member 1-3 is provided with a positioning structure, a YZ-direction positioning pin 3-1 is disposed on a surface of the spoiler 1-1, a YZ-direction positioning hole 3-3 is formed in the windscreen decorating member 1-3, a Y-direction auxiliary positioning pin 3-2 is disposed on a surface of the inner plate 4, the spoiler 1-1 is adhered to the inner plate 4 with an adhesive to form a tail door body, and in this way, the spoiler 1-1 and the inner plate 4 are assembled into a whole; and then, the Y-direction auxiliary positioning pin is used for auxiliary positioning before assembly to enable the YZ-direction positioning pin 3-1 on the windscreen decorating member 1-3 to match the YZ-direction positioning hole 3-3 in the windscreen decorating member 1-3 for positioning, so that the windscreen decorating member 1-3, the spoiler 1-1 and the inner plate 4 are assembled together. Here, since the Y-direction auxiliary positioning pin is formed on the inner plate 4, and the YZ-direction positioning pin 3-1 is formed on the spoiler 1-1, so that the windscreen decorating member 1-3 is smaller and lighter, the assembly clearance of the windscreen decorating member 1-3 is effectively guaranteed, and a good appearance is guaranteed.

Figure 9:
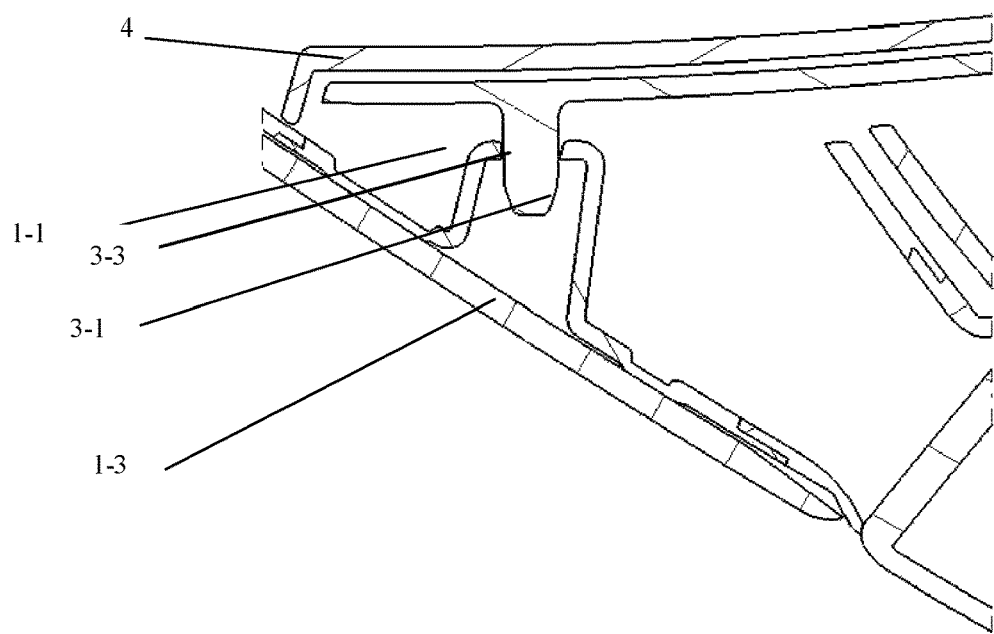
FIG. 9 is a sectional view along A-A in FIG. 8.
Figure 10:
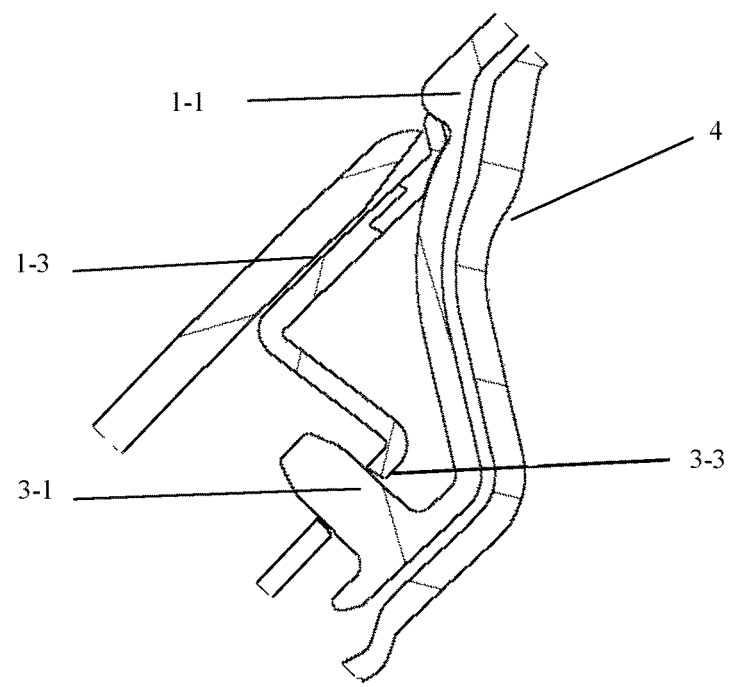
FIG. 10 is a sectional view along B-B in FIG. 8.

As shown in FIG. 9 and FIG. 10, the windscreen decorating member 1-3 is assembled on the tail door body formed by adhering the spoiler 1-1 to the inner plate 4, an upward bevel is formed between the YZ-direction positioning pin 3-1 and the windscreen decorating member 1-3 in a horizontal direction, so that the windscreen decorating member 1-3 can be pre-hanged on the YZ-direction positioning pin 3-1 by means of its gravity when assembled, which means that a pre-hanging effect is realized; and then, the windscreen decorating member 1-3 is tightened, so that installation is easier and faster.

Figure 11:
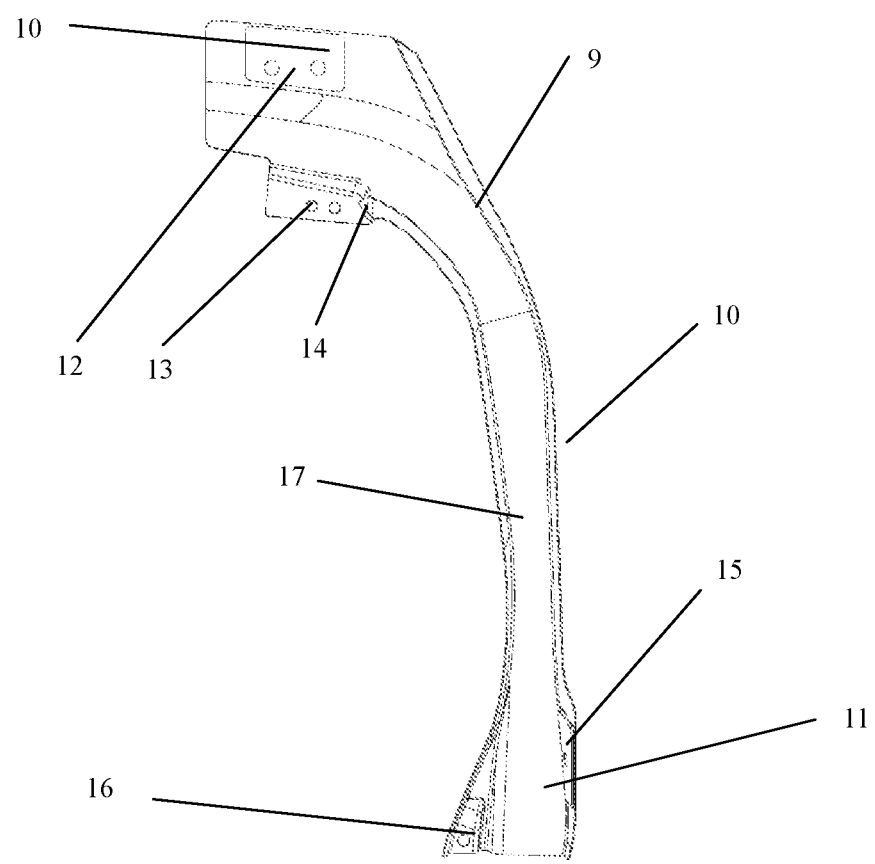
FIG. 11 is a front structural view of a metal reinforcing plate of an inner plate of the plastic tail door.
Figure 12:
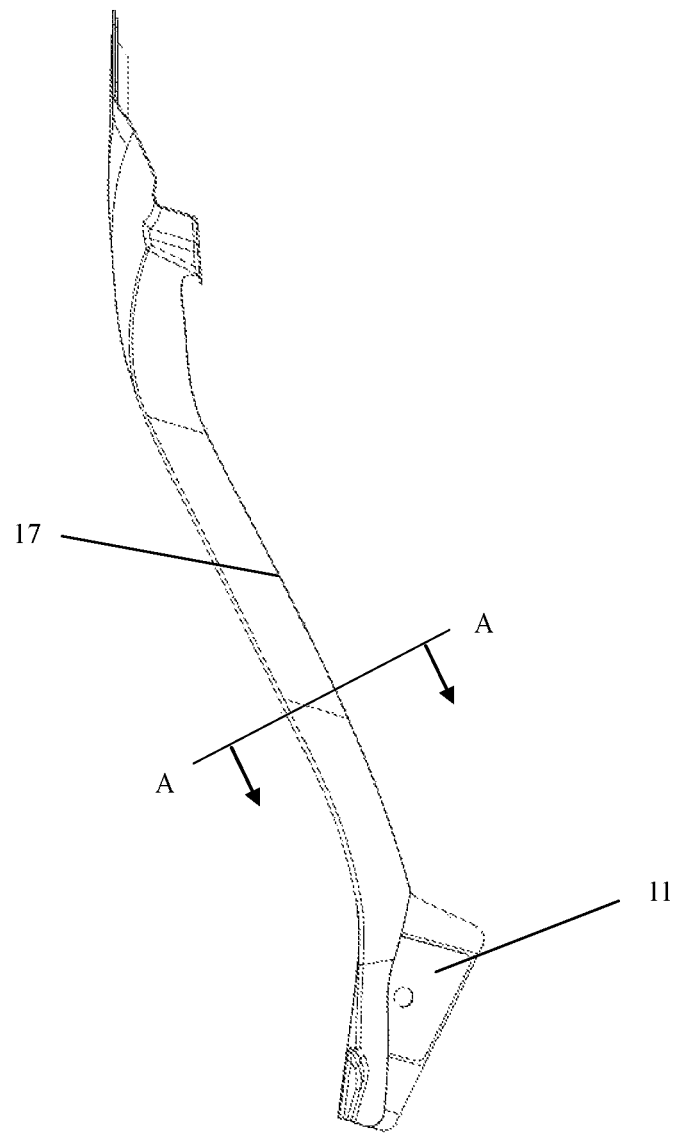
FIG. 12 is a structural view of the back of the metal reinforcing plate of the inner plate of the plastic tail door.

As shown in FIG. 11 and FIG. 12, a metal reinforcing plate is disposed on a visible side of the inner plate 4, that is, the metal reinforcing plate is mounted on a side fitting a mold during injection-molding of a mold insert of the tail door inner plate 4, and as shown in FIG. 1 and FIG. 2, mainly comprises a pillar reinforcing plate 9, a hinge reinforcing plate 10 and a ball pin reinforcing plate 11, wherein the hinge reinforcing plate 10 and the ball pin reinforcing plate 11 are electrically welded to an upper end and a lower end of the pillar reinforcing plate 9 respectively, and the hinge reinforcing plate 10 and the ball pin reinforcing plate 11 are both 2 mm galvanized steel sheets, so that the lightweight effect of the whole metal reinforcing plate is good, materials are saved, and the weight and cost are reduced; the hinge reinforcing plate 10 is formed with a hinge mounting hole 12, an internal decorating member mounting hole 13 is formed in a lower end of the hinge reinforcing plate 10 on the pillar reinforcing plate 9, a first auxiliary positioning hole 14 is formed beside the internal decorating member mounting hole 13, a second auxiliary positioning hole 16 is formed in a lower end of the pillar reinforcing plate 9, and the first auxiliary positioning hole 14 and the second auxiliary positioning hole 16 are located on the same plane. Here, the internal decorating member mounting hole 13 facilitates the installation and fixation of an internal decorating member, and the auxiliary positioning holes are used for auxiliary positioning and installation, so that installation is easy and fast.

Figure 13:
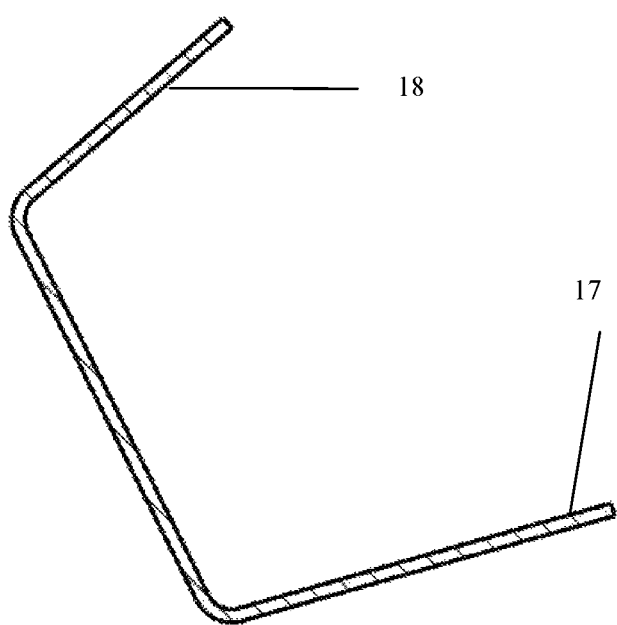
FIG. 13 is a structural view along A-A of FIG. 12.

As shown in FIG. 13, a first flange 18 and a second flange 17 used for improving the stiffness of the pillar reinforcing plate 9 are disposed on two sides of the pillar reinforcing plate 9, and a U-groove structure is formed by the first flange 18, the second flange 17 and the pillar reinforcing plate 9, wherein the first flange 18 is located on a right side, the second flange 17 is located on a left side, the first flange 18 extends to a tail end of an area, where the hinge reinforcing plate 10 is located, from the position of the ball pin reinforcing plate 11, the second flange 17 extends to a platform area, where the first auxiliary positioning hole 14 is located, from an area where the second auxiliary positioning hole 16 is located, and the width of the first flange 18 and the second flange 17 is greater than 20 mm. In this way, the flanges on the two sides of the pillar reinforcing plate 11 have a large size, which guarantees uniform and good stiffness. The ball pin reinforcing plate 11 is formed with a ball pin mounting hole 15, and the ball pin reinforcing plate 11 and the pillar reinforcing plate 9 of a triangular structure, so that the same stiffness is realized, and the design of the metal reinforcing part of the plastic tail door is simplified.

The specific embodiments described in this specification are merely examples for explaining the invention. Those skilled in the art can make various modifications, supplements or similar substitutions to these specific embodiments without departing from the scope defined by the spirit of the invention.

What is claimed is:

1. A high-integration-level plastic tail door, comprising a tail door upper outer plate, a tail light, a tail door lower outer plate, an inner plate and a high brake light, wherein the tail door upper outer plate, as a whole, is integrated with a spoiler, a tail door windshield, a windscreen decorating member and a high brake light cover; the tail door upper outer plate has two layers and is formed by double-shot molding, with a first layer being a transparent layer and a second layer being a black non-transparent layer; a first open hole is formed in a position of the high brake light in the black non-transparent layer area, and a second open hole is formed in a middle of the tail door windshield; and a hardened coating is arranged on an outer layer of the transparent layer;

wherein the inner plate is provided with a metal reinforcing plate which comprises a pillar reinforcing plate, a hinge reinforcing plate and a ball pin reinforcing plate, wherein the hinge reinforcing plate and the ball pin reinforcing plate are electrically welded to an upper end and a lower end of the pillar reinforcing plate respectively, wherein a first flange and a second flange for improving stiffness of the pillar reinforcing plate are disposed on two sides of the pillar reinforcing plate, wherein a U-groove structure is formed by the first flange, the second flange and the pillar reinforcing plate, and wherein the first flange extends to a tail end of an area where the hinge reinforcing plate is located from a position of the ball pin reinforcing plate.

2. The high-integration-level plastic tail door according to claim 1, wherein the tail door upper outer plate comprises, from left to right, a windshield transparent area, an original windshield black-edge area and a windscreen decorating member area, the windshield transparent area only comprises a single layer with transparent layer, the second open hole is located in the windshield transparent area, an inner layer of the original windshield black-edge area and the windscreen decorating member area is the black non-transparent layer, the black non-transparent layer is located below the transparent layer, and the inner plate is adhered to the black non-transparent layer of the tail door upper outer plate through an adhesive layer.

3. The high-integration-level plastic tail door according to claim 2, wherein in a spoiler area, the inner plate is adhered to the tail door upper outer plate the adhesive layer, the tail door upper outer plate is only provided with a single layer with transparent layer at a position of the high brake light, the first open hole is formed in the black non-transparent layer beside the high brake light, a high brake mounting structure is disposed on a periphery the black non-transparent layer, and the high brake light is mounted on the high brake mounting structure from an inner side of the tail door upper outer plate.

4. The high-integration-level plastic tail door according to claim 3, wherein the transparent layer at a lower end of the tail door upper outer plate and the black non-transparent layer below the transparent layer extend below the tail light and are adhered to the tail door lower outer plate through the adhesive layer, and the tail door lower outer plate is adhered to the inner plate through the adhesive layer.

5. The high-integration-level plastic tail door according to claim 1, wherein a YZ-direction positioning pin is disposed on a surface of the spoiler, a YZ-direction positioning hole is formed in the windscreen decorating member, the YZ-direction positioning pin on the windscreen decorating member matches the YZ-direction positioning hole in the windscreen decorating member for positioning, a Y-direction auxiliary positioning pin is disposed on a surface of the inner plate, the spoiler is adhered to the inner plate with an adhesive to form a tail door body, and the windscreen decorating member is assembled on tail door body formed by adhering the spoiler to the inner plate.

6. The high-integration-level plastic tail door according to claim 5, wherein an upward bevel is formed between the YZ-direction positioning pin and the windscreen decorating member in a horizontal direction.

7. The high-integration-level plastic tail door according to claim 1, wherein the hinge reinforcing plate and the ball pin reinforcing plate are both 2 mm galvanized steel sheets, and the first flange and the second flange have a width greater than 20 mm.

8. The high-integration-level plastic tail door according to claim 7, wherein the hinge reinforcing plate is formed with a hinge mounting hole, an internal decorating member mounting hole is formed in a lower end of athe hinge reinforcing plate on the pillar reinforcing plate, a first auxiliary positioning hole is formed beside the internal decorating member mounting hole, a second auxiliary positioning hole is formed in an upper end of the pillar reinforcing plate, and the first auxiliary positioning hole and the second auxiliary positioning hole are located on a same plane.

9. The high-integration-level plastic tail door according to claim 8, wherein the ball pin reinforcing plate is formed with a ball pin mounting hole, the ball pin reinforcing plate and the pillar reinforcing plate are of a triangular structure, and the second flange extends to a platform area where the first auxiliary positioning hole is located from an area where the second auxiliary positioning hole is located.

* * * * *